(12) United States Patent
Martin et al.

(10) Patent No.: US 8,762,019 B2
(45) Date of Patent: Jun. 24, 2014

(54) OPERATION METHOD OF A TRANSMISSION DEVICE

(75) Inventors: Gerhard Hermann Martin, Tettnang (DE); Wilfrid Eberhard, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 370 days.

(21) Appl. No.: 13/208,523

(22) Filed: Aug. 12, 2011

(65) Prior Publication Data

US 2012/0041656 A1 Feb. 16, 2012

(30) Foreign Application Priority Data

Aug. 12, 2010 (DE) .......................... 10 2010 039 265

(51) Int. Cl.
  *G06F 7/00* (2006.01)
  *B62D 61/10* (2006.01)
  *B60K 17/344* (2006.01)
  *B60K 17/35* (2006.01)

(52) U.S. Cl.
  USPC ........... 701/69; 180/24.09; 180/248; 180/249

(58) Field of Classification Search
  CPC .................................................. B60K 23/0808
  USPC .................... 701/58, 69; 180/24.09, 248, 249
  See application file for complete search history.

(56) References Cited

U.S. PATENT DOCUMENTS

| 6,907,953 B2 | 6/2005 | Shigeta et al. |
| 2006/0254845 A1 | 11/2006 | Baasch et al. |
| 2010/0170737 A1* | 7/2010 | Meissner et al. ............... 180/248 |

FOREIGN PATENT DOCUMENTS

| DE | 103 04 811 A1 | 8/2004 |
| DE | 10 2005 021 901 A1 | 11/2006 |
| DE | 603 15 633 T2 | 5/2008 |

* cited by examiner

*Primary Examiner* — Fadey Jabr
*Assistant Examiner* — Basil T Jos
(74) *Attorney, Agent, or Firm* — Davis & Bujold, PLLC; Michael J. Bujold

(57) ABSTRACT

A method of operating a transmission device comprising at least one input shaft and at least two output shafts. Torque that is present at the input shaft can be distributed between the two output shafts with a variable degree of distribution which can be changed according to the operating state depending on a transmission capability of at least one shift element. When a request to set a predefined degree of distribution is received, a mechanical self-locking torque of the transmission device—which influences the degree of distribution between the output shafts and is dependent upon the torque present at the input shaft—is determined, and a difference between the mechanical self-locking torque and a target overall locking torque of the transmission device that is equivalent to the required degree of distribution is determined. The transmission capability of the at least one shift element is set depending on this difference.

10 Claims, 2 Drawing Sheets

OPERATION METHOD OF A TRANSMISSION DEVICE

This application claims priority from German patent application serial no. 10 2010 039 265.0 filed Aug. 12, 2010.

FIELD OF THE INVENTION

The invention relates to a method for operating a transmission device comprising at least one input shaft and at least two output shafts.

BACKGROUND OF THE INVENTION

Vehicles known from practice are equipped with at least one transmission device disposed between a drive device and an output drive, in order to obtain various operating ranges, such as a forward gear, a reverse gear, and trailing throttle operation and a traction mode. The input torque of the drive device is transmitted to the front axle in front-wheel drive vehicles, to the rear axle in rear-wheel drive vehicles, and to two or more driven vehicle axles with various degrees of distribution in all-wheel drive vehicles.

In all these vehicles, the transmission devices are each equipped with a main gearbox, which can be used to obtain various gear ratios. Such main gearboxes are usually in the form of a manual transmission, multistage automatic transmission, or continuously variable automatic transmission.

In order to allow the distribution of the torque output by the drive device among multiple drivable vehicle axles in the longitudinal direction of a vehicle, each of the transmission devices of the above-described main gearboxes features a downstream longitudinal transfer case in the power flow of a drive train, which may take the form of separate structural units, can be integrated into the main gearbox, or may take the form of "hang-on" solutions on the main gearbox.

Moreover, the input torque supplied to a drivable vehicle axle is distributed between the two drive wheels of this drive axle using a transverse transfer case, wherein the drive wheels of the drivable vehicle axle can be driven independently of one another at different speeds in accordance with the different distances to be covered by the left wheel and the right wheel. As a result, the input torque can be symmetrically distributed to the particular drive wheels of the drivable vehicle axle and, therefore, free of yaw moment.

These advantages are offset, however, by the disadvantage that the drive forces of the drive wheels of a vehicle axle, which are transferred to the roadway, are dependent upon the lower or lowest transmissible input torque of the particular drive wheel due to the compensatory effect of a transverse transfer case, which is in the form of a differential. If a drive wheel positioned e.g. on slippery ice spins, for example, the other drive wheel is not supplied with more torque than the spinning drive wheel, even if the other drive wheel is positioned on a non-slip surface. In this kind of driving situation, the vehicle is unable to move forward, which is disadvantageous due to the compensatory effect of a differential, which enables two output shafts of a differential to rotate at different speeds.

To overcome this disadvantage, practical applications are now based on limiting or preventing compensatory movement of the differential by implementing suitable measures if critical vehicle states exist. This is achieved, for instance, via a differential lock known per se, which can be activated manually or automatically using mechanical, magnetic, pneumatic, or hydraulic means, which limits compensatory movement between the drive wheels completely or partially by locking the differential.

The differential lock may take the form of a hydraulically actuatable shift element, via which torque present at an input shaft of the differential can be distributed between two output shafts of the differential—which are interacting with the drive wheels—in accordance with a degree of distribution required. Output torque that is generated at one output shaft can therefore differ from the output torque that is generated at the other output shaft. This degree of distribution can be changed according to the operating state corresponding to the particular driving situation depending on the transmission capability of the shift element.

Differential locks of transfer cases designed as hydraulically actuatable shift elements are usually operated in a state of permanent slip. A robust design is therefore required, and high requirements are placed on the actuating accuracy, the actuating dynamics, and the dynamics during disengagement of the shift element since these have a strong influence on the driving dynamics of a vehicle.

SUMMARY OF THE INVENTION

The problem addressed by the present invention is therefore that of providing a method for operating a transmission device, via which desired driving dynamics of a vehicle can be adjusted with minimal complexity in terms of control and adjustment.

In the method for operating a transmission device comprising at least one input shaft and at least two output shafts according to the invention, torque that is present at the input shaft can be distributed between the output shafts with a variable degree of distribution, and the degree of distribution can be changed according to the operating state depending on the transmission capability of at least one shift element. According to the invention, when a request to set a predefined degree of distribution is received, a mechanical self-locking torque of the transmission device—which influences the degree of distribution between the output shafts and is dependent upon the torque present at the input shaft—is determined, and a difference between the mechanical self-locking torque and a target overall locking torque of the transmission device that is equivalent to the required degree of distribution is determined, wherein the transmission capability of the at least one shift element is set as a function of this difference.

Using the method according to the invention, the setpoint assignment and the required target overall locking torque can be implemented with minimal control-related complexity since the transmission capability of the shift element required to set the required target overall locking torque can be determined depending on the mechanical self-locking torque of the transmission device, which is easily determined and influences the overall locking torque of the transmission device in a manner that is not unsubstantial. In that case, an amount of target overall locking torque that is preferably specified by a setpoint generator and physically comprises the self-locking torque is reduced by the self-locking torque which is preferably determined via computer, and the remaining portion of the target overall locking torque to be applied in the region of the shift element by applying an appropriate actuating force to the shift element is first determined via computer and is set in the region of the shift element. The shift element can be actuated hydraulically, mechanically, electromechanically, or electrohydraulically.

Using the approach according to the invention, the self-locking torque of the transmission device is compensated for, thereby enabling the transmission capability of the shift element of the transmission device to be operated with good actuating accuracy and high actuating dynamics, and with desired dynamics during a disengagement procedure, and a vehicle having desired driving dynamics is made available.

In the event that, while implementing the method according to the invention, it is determined that a target overall locking torque of the transmission device is less than or equal to the mechanical self-locking torque of the transmission device, in one variant of the method according to the invention the transmission capability of the shift element is set to at least approximately zero. This results from the fact that the overall locking torque of the transmission device corresponds to at least the mechanical self-locking torque of the transmission device, which cannot be undershot. The mechanical self-locking torque of the transmission device represents a lower physical limit that prevents implementation of the overall locking torque required to set a desired degree of distribution of the input torque between the output shafts of the transmission device. In order to nonetheless meet the demand, the transmission capability of the shift element is set to at least approximately zero, and so the deviation between the actual overall locking torque and the required target overall locking torque is as low as possible.

Since the mechanical self-locking torque varies depending on the transmission capability of the shift element, an advantageous variant of a method according to the invention provides that the transmission capability of at least one shift element is adjusted depending on the mechanical self-locking torque, which has been corrected in respect to transmission capability, thereby making it advantageously possible to set a desired degree of distribution of the input torque between the output shafts to the desired extent with minimal control-related complexity and high control quality.

The mechanical self-locking torque can be determined in a particularly simple manner by using an characteristic map.

The mechanical self-locking torque's dependence on the torque present at the input shaft can be taken into account easily via the characteristic map, wherein a percentage value can be stored in the characteristic map, for example, which can be made available for calculating the mechanical self-locking torque on the basis of the torque present at the input shaft. As an advantage, this procedure can easily be implemented in a control device of the transmission device.

The more precisely the actual mechanical self-locking torque of the transmission device is determined, the better the transmission capability of the shift element can be, in order to attain the desired degree of distribution. To this end, at least one additional parameter, preferably one that has been determined using measurement technology, can be stored in the characteristic map, for example a speed differential between the output shafts, a sign of the speed differential between the output shafts, an operating temperature of the transmission device, a running performance of the transmission device, and/or an actuation parameter of the at least one shift element.

In a preferred embodiment of a method according to the invention, the at least one shift element is in the form of a hydraulically actuatable, frictionally engaged shift element, in particular a multi-disk clutch, wherein the transmission capability of the shift element can be set via an actuating pressure that can be applied to the shift element depending on the operating state. The shift element can be operated in a state of permanent slip when designed accordingly.

The mechanical self-locking torque varies depending on the operating state, wherein changes result from the torque present at the respective input shaft, a speed differential between the output shafts, a sign of the speed differential between the output shafts, a current operating temperature of the transmission device, a running performance of the transmission device, and/or an actuating parameter of the at least one shift element. Since these operating parameters change over the course of an operating state, an accurate setting of a desired degree of distribution of the input torque between the output shafts is attained by determining the mechanical self-locking torque of the transmission device depending on the current operating point of the transmission device.

The method according to the invention can be used, advantageously, for the operation of a transmission device in the form of a transverse transfer case or differential which comprises a transverse lock formed by the at least one shift element. Torque that is present at the input shaft of the transmission device is distributed between two output shafts, each of which is connected to a drive wheel, wherein, by changing the transmission capability of one shift element, torque that is present at the input shaft can be distributed between the output shafts at least approximately with a degree of distribution required to attain a desired driving situation.

Alternatively, or in addition thereto, the method according to the invention can be used with a transmission device that is in the form of a longitudinal transfer case, wherein the longitudinal transfer case makes it possible to distribute torque present at the input shaft with a variable degree of distribution between at least two vehicle longitudinal axles, each of which interacts with one drivable vehicle axle.

Both the features indicated in the claims, and the features indicated in the embodiment of the method according to the invention, which is presented below, are suitable for developing the subject matter of the invention alone or in any combination. The particular combinations of features do not represent a limitation of the development of the subject matter according to the invention, and instead are largely presented merely as examples.

BRIEF DESCRIPTION OF THE DRAWINGS

Further advantages and advantageous embodiments of the subject matter according to the invention will become apparent from the claims and the embodiment described below with respect to the principle, with reference to the drawings. They show:

DETAILED DESCRIPTION OF THE PREFERRED EMBODIMENTS

Figure 1:
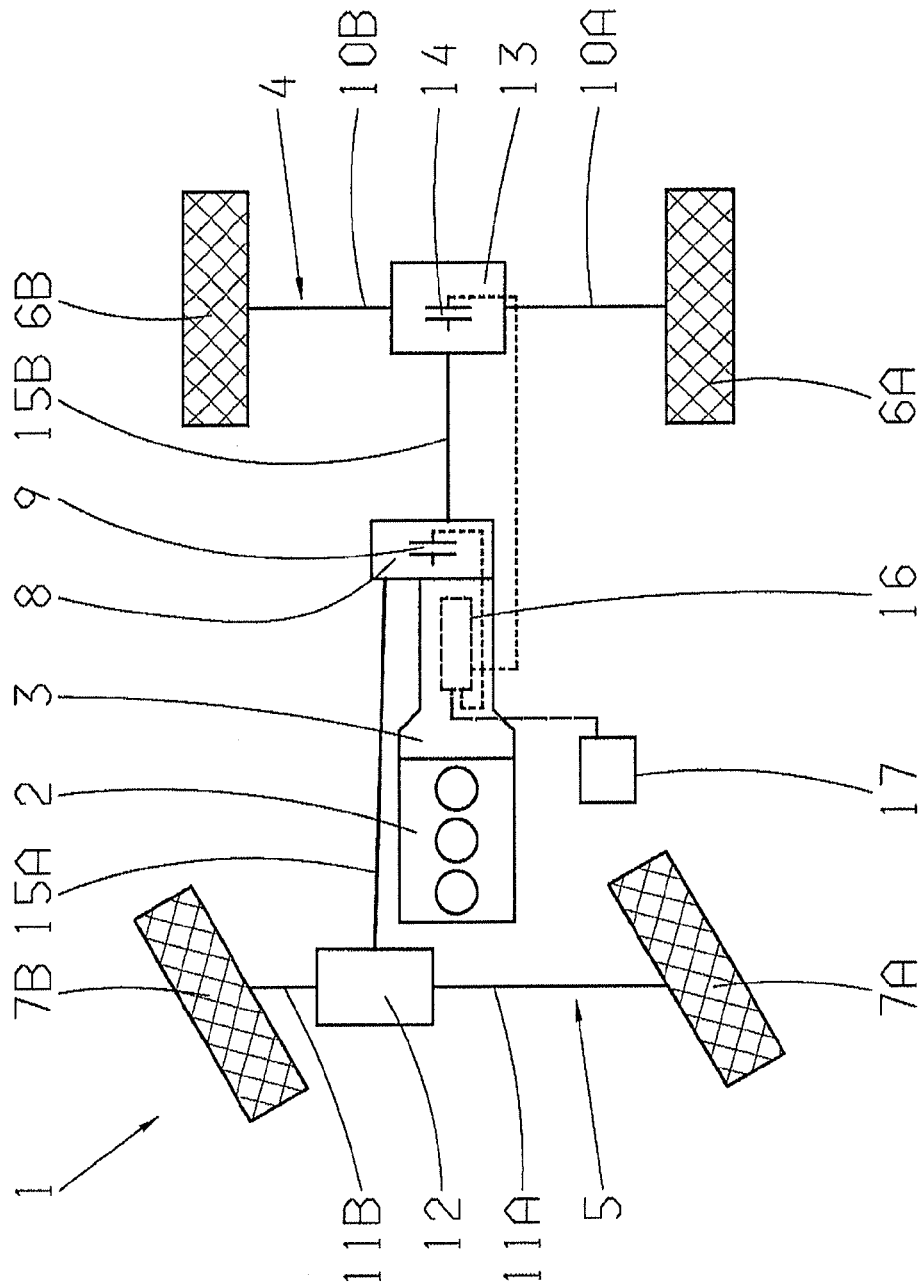
FIG. 1 a simplified schematic representation of a motor vehicle drive train that includes a transfer case and a differential that includes a shift element in the form of a transverse lock.

FIG. 1 shows a drive train 1 of an all-wheel drive vehicle in a highly schematized representation. The drive train 1 comprises a drive motor 2 and a main gearbox 3, via which various gear ratios for forward and reverse travel can be obtained, and which can be any transmission known per se from practical application.

In the embodiment of the vehicle drive train 1 shown in FIG. 1, the drive motor 2 is designed as an internal combustion engine and, in an advantageous development, can also be in the form of an electric motor or a hybrid drive.

The drive train 1 comprises two drivable vehicle axles 4, 5 which are connected in a known manner on each side of the vehicle to at least one drive wheel 6A, 6B or 7A, 7B, respectively, and of which the vehicle axle 4 is the vehicle rear axle in this case, and the vehicle axle 5 is the vehicle front axle. A transmission device 8 in the form of a longitudinal transfer case is disposed between the main gearbox 3 and the vehicle axles 4, 5, via which input torque of the drive motor 2 present at a drive shaft which is not depicted in the drawing is distributed via a first vehicle longitudinal axle 15A and a second vehicle longitudinal axle 15B between the vehicle rear axle 4 and the vehicle front axle 5. In order to set a degree of distribution of the input torque between the vehicle rear axle 4 and the vehicle front axle 5 in a variable manner, the longitudinal transfer case 8 comprises, in this case, a frictionally engaged shift element in the form of a multi-disk clutch 9.

In order to distribute the portion of input torque supplied to each of the vehicle axles 4, 5 between two output shafts 10A, 10B and 11A, 11B assigned to a vehicle axle 4, 5, respectively, and connected to drive wheels 6A, 6B and 7A, 7B, respectively, a transverse transfer case 13 and 12 is provided between the longitudinal transfer case 8 and the drive wheels 6A, 6B and 7A, 7B, respectively. Both the transverse transfer case 12 assigned to the vehicle front axle 5 and the transverse transfer case 13 assigned to the vehicle rear axle 4 are in the form of differentials. The differential 13 disposed in the region of the vehicle rear axle 4 likewise comprises a frictionally engaged shift element 14, via which torque present at the vehicle longitudinal shaft 15B of the differential 13 can be distributed in a variable manner between the output shafts 10A and 10B and the drive wheels 6A, 6B of the differential 13 and the drive wheels 6A, 6B of the vehicle rear axle 4. In alternative embodiments of the invention, the shift element—which, in this case, is in the form of a hydraulically actuatable multi-disk clutch 14 and is a differential lock—can also be actuated using mechanical, magnetic, or pneumatic means. A hydraulic control device 16 which is activated by an electronic transmission controller 17 is provided in this case to actuate multi-disk clutches 9 and 14.

A method for operating the differential 13 with the multi-disk clutch 14 is described in the following. This method can be used in an analogous manner to operate the longitudinal transfer case 8 with the multi-disk clutch 9, and therefore the method will be described in greater detail in the following description of FIG. 1 and FIG. 2 as an example by reference to the differential 13.

In this case, the multi-disk clutch 14 is disposed between an output shaft 10A of the differential 13 and a differential carrier—which is not depicted—of the differential 13. In the disengaged operating state of the multi-disk clutch 14, torque present at the differential 13 is distributed equally between the output shafts 10A, 10B. The amount of torque that can be transmitted to the output shafts 10A, 10B is dependent upon the output shaft 10A and 10B, and upon the respective drive wheel 6A, 6B connected thereto, in the region of which the lower torque can be transferred in the current operating state of the drive train 1. When a drive wheel 6A or 6B positioned on slippery ice spins, for instance, the other drive wheel 6B or 6A is therefore not supplied with more torque than the spinning drive wheel 6A or 6B, even if it is positioned on a non-slip surface. In such a driving situation, the vehicle is unable to move forward, which is disadvantageous, due to the compensatory effect of the differential 13, which makes it possible for the two output shafts 10A, 10B to rotate at different speeds.

To counteract such a situation, the degree to which the differential 13 locks can be varied by changing the transmission capability M_LK of the multi-disk clutch 14 such that torque is transferred to the output shaft 10A or 10B having the drive wheel 6A or 6B, respectively, that has the lesser degree of slippage.

In order to accomplish this, an appropriate control command is transmitted from the electronic transmission controller 17 to the hydraulic control device 16 which, in response thereto, applies a certain actuating pressure to the multi-disk clutch 14. The transmission capability M_LK of the multi-disk clutch 14 increases as a result, i.e. greater torque is transmitted via the multi-disk clutch 14, and torque present at the vehicle longitudinal axis 15B of the differential 13 is distributed between the output shafts 10A, 10B with another degree of distribution that is adapted to the current driving situation.

A desired degree of torque distribution present at the differential 13 between the output shafts 10A, 10B via the vehicle longitudinal shaft 15B is specified by a higher-order driving strategy, in particular an electronic stability program (ESP), e.g. depending upon a steering angle, transversal acceleration, and the like, and is the guide parameter for control purposes. In order to set the required degree of distribution, a target overall locking torque M_SGS that is equivalent to the required degree of distribution must be set in the region of the differential 13.

An actual overall locking torque of the differential 13 that is actually present depends on a sum of a mechanical self-locking torque M_SS of the differential 13 and the variable transmission capability M_LK of the multi-disk clutch 14. The mechanical self-locking torque M_SS is a physical parameter of the differential 13 that results from the mechanical design of the differential 13 and multiple parameters. Locking and frictional forces in particular, which result, inter alia, from a gearing geometry in the region of the gearing of the differential 13, influence the magnitude of the mechanical self-locking torque M_SS.

The degree of distribution with which torque present at the differential 13 is distributed between the output shafts 10A and 10B varies depending on the mechanical self-locking torque M_SS. This means that torque present at the vehicle longitudinal shaft 15B is distributed in a ratio that is dependent upon the mechanical self-locking torque M_SS between the output shafts 10A, 10B, wherein the greater portion of the torque is transferred to the drive wheel 6A or 6B that has greater adhesion and, therefore, less slip.

In order to minimize deviation between the target overall locking torque M_SGS and the actual overall locking torque M_IGS, the mechanical self-locking torque M_SS of the differential 13 that is actually present is determined as accurately as possible. In this case, the fact that the mechanical self-locking torque M_SS is dependent upon the torque present at the input shaft 15 on a percentage basis is taken into account in the determination. In order to determine the mechanical self-locking torque M_SS exactly, this percentile dependence is read out of an characteristic map, wherein dependence on the operating temperature of the differential 13 and a running performance of the differential 13 is also taken into account via the characteristic map. The interrelationships that are incorporated via the characteristic map can be determined empirically, or they can be determined using appropriate models stored in the controller.

In addition, dependence between the transmission capability M_LK of the multi-disk clutch 14 and the mechanical self-locking torque M_SS is taken into account via the characteristic map. The percentage value stored in the characteristic map, via which the mechanical self-locking torque M_SS is calculated depending on the torque present at the differential 13, is also used for determining the influence of the transmission capability M_LK of the multi-disk clutch 14 on the mechanical self-locking torque M_SS, wherein the torque that can be transmitted via the multi-disk clutch 14 is multiplied by the percentage value of the characteristic map, and the mechanical self-locking torque M_SS is increased or reduced depending on the sign of the speed differential between the output shafts 10A and 10B of the differential 13.

The mechanical self-locking torque M_SS corresponds to the magnitude of the product of a difference between the torque present at the vehicle longitudinal shaft 15B and the transmission capability M_LK of the multi-disk clutch 14, wherein the sign of the transmission capability of the multi-disk clutch 14 varies depending on the sign of the speed differential between the output shafts 10A, 10B, and the percentage value determined from the characteristic map.

The operating parameters required to determine the overall mechanical self-locking torque M_SS are determined via measurement using sensors. The current operating temperature of the differential 13 is determined via a temperature sensor disposed in the differential 13, and a running performance of the differential 13 is determined via an odometer.

The speed differential between the output shafts 10A, 10B that is likewise required to determine the mechanical self-locking torque M_SS is determined, in particular, via speed sensors of an antilock braking system disposed in the region of drive wheels 6A, 6B. In this case, the transmission capability M_LK of the multi-disk clutch 14 is determined via a pressure sensor disposed in a supply line of the hydraulic system, in particular, or via another suitable method.

The actual overall locking torque M_IGS can be easily adapted to a desired target overall locking torque M_SGS in particular by setting the transmission capability M_LK of the multi-disk clutch 14 accordingly. In order to set an actual overall locking torque M_IGS that is located as close as possible to the target overall locking torque M_SGS within short operating times, the mechanical self-locking torque M_SS that is actually present is determined with a high-degree of accuracy using the procedure according to the invention.

Since the mechanical self-locking torque M_SS changes even when only one of the aforementioned parameters changes, the mechanical self-locking torque M_SS is determined depending on the operating point of the differential 13 present at the moment, in order to adapt the transmission capability M_LK of the multi-disk clutch 14 with a high level of spontaneity to a new driving situation that exists, and to adapt the actual overall locking torque M_ISG to the target overall locking torque M_SGS.

If, during an operating state of the differential 13, it is determined that the mechanical self-locking torque M_SS is greater than a specified target overall locking torque M_SGS, the multi-disk clutch 14 is acted upon with a corresponding level of actuating pressure. The transmission capability M_LK of the multi-disk clutch 14 then corresponds substantially to a difference of the target overall locking torque M_SGS and the mechanical self-locking torque M_SS. The functional interrelationship between the mechanical self-locking torque M_SS and the transmission capability M_LK of the multi-disk clutch 14 is also taken into account.

If the target overall locking torque M_SGS to be implemented in the region of the differential 13 is less than or equal to the mechanical self-locking torque M_SS, the multi-disk clutch 14 is left in the disengaged operating state, or is transferred to a disengaged operating state, in which substantially no torque can be transferred via the multi-disk clutch 14. The actual overall locking torque M_IGS of the differential 13 then corresponds to the mechanical self-locking torque M_SS.

Figure 2:
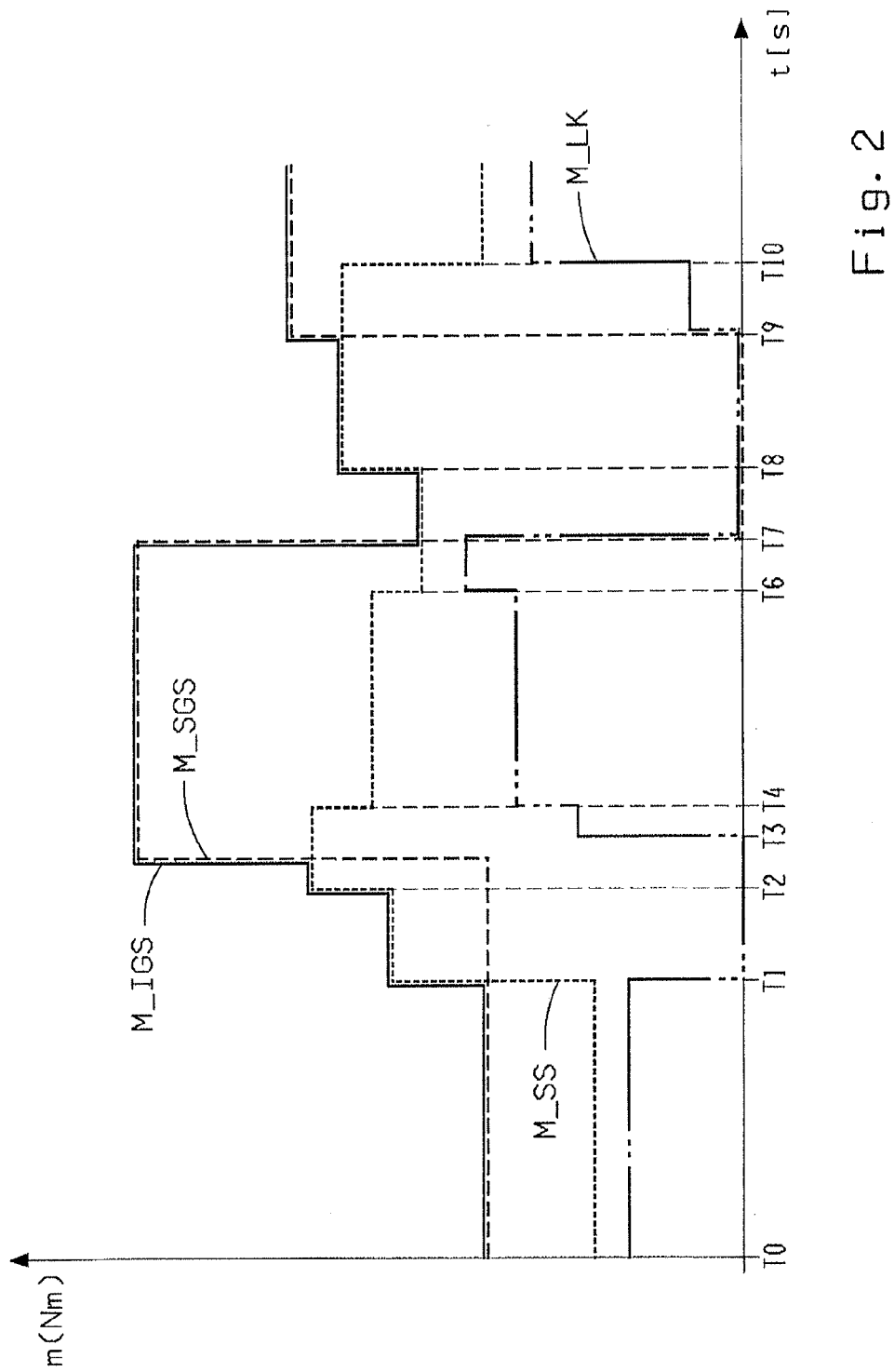
FIG. 2 a simplified depiction of the behavior of the torque present at the differential over time.

FIG. 2 shows a sample graph of the target overall locking torque M_SGS, the actual overall locking torque M_IGS, the mechanical self-locking torque M_SS, and the transmission capability M_LK of the multi-disk clutch 14 as a function of time t.

At an initial point in time T0, a target overall locking torque M_SGS specified by the higher-order driving strategy is greater than the mechanical self-locking torque M_SS that is determined. The transmission capability M_LK of the multi-disk clutch 14 is set in such a manner that the sum of the mechanical self-locking torque M_SS and the transmission capability M_LK of the multi-disk clutch 14, which is the actual overall locking torque M_ISG that is actually present, corresponds to the specified target overall locking torque M_SSG.

The mechanical self-locking torque M_SS increases at a time T1. The increase can be triggered, for instance, by an increase in the torque present at the vehicle longitudinal shaft 15B. The change in torque can result, in particular, from an actuation of the gas pedal by the driver, or from a gear ratio change in the region of the main gearbox 3.

The mechanical self-locking torque M_SS increases abruptly at time T1 to a level above the specified target overall locking torque M_SGS. Since the mechanical self-locking torque M_SS is a lower level of the actual overall locking torque M_IGS of the differential 13, the transmission capability M_LK of the multi-disk clutch 14 is reduced to zero in order to hold the actual overall locking torque M_IGS to a minimum and prevent an unwanted large deviation between same and the target overall locking torque M_SGS.

At a time T2, the mechanical self-locking torque M_SS increases due to a change in operating state in the drive train 1, and is still above the target overall locking torque M_SGS to be set. Since the transmission capability M_LK of the multi-disk clutch 14 has already been set to zero, the required target overall locking torque M_SGS cannot be set.

Finally, at a time T3, the target overall locking torque M_SGS is increased in accordance with a requirement of the driving strategy to a level that is above the current mechanical self-locking torque M_SS. The increase in the specified target overall locking torque M_SGS can be specified by a higher-order driving strategy due e.g. to a changed friction coefficient in the region of one of the drive wheels 6A, 6B. The transmission capability M_LK of the multi-disk clutch 14 is increased accordingly in order to guide the actual overall locking torque M_IGS from the value formed exclusively by the mechanical self-locking torque M_SS at the point in time T2 to the value of the newly specified target overall locking torque M_SGS. As a result, the actual overall locking torque M_IGS at the point in time T3 corresponds to the target overall locking torque M_SGS. When the actuating force required therefor is set, the change induced by the adaptation of the transmission capability of the multi-disk clutch 14 is taken into account in the region of the mechanical self-locking torque M_SS.

If the target overall locking torque M_SGS continues to remain constant, the mechanical self-locking torque M_SS diminishes at the point in time T4. This can be caused by a change in a gas pedal position induced by the driver, or by a gear ratio change in the main gearbox 3, wherein torque that is present at input shaft 15 is reduced, in contrast to the procedures described with reference to points in time T1 and T2. To compensate for this reduction in the mechanical self-locking torque M_SS, a transmission capability M_LK of the multi-disk clutch 14 is increased with consideration for the resulting change in the mechanical self-locking torque M_SS, and the actual overall locking torque M_IGS is raised at the point in time T4 to a value corresponding to the target overall locking torque M_SGS.

At the point in time T5, an operating state change in the drive train 1 described with reference to the point in time T4 exists, from which the changes in the operating state graphs shown in FIG. 2 result, which were explained in the description presented above.

A target overall locking torque M_SGS which has been reduced to zero in this case is specified by a higher-order driving strategy at the point in time T6. The mechanical self-locking torque M_SS is now greater than the target overall locking torque M_SGS and is the minimum limit value of the actual overall locking torque M_IGS that can be set, even if the transmission capability M_LK of the multi-disk clutch 14 is reduced to zero.

At the points in time T7, T8 and T9, equivalent operating state changes of the drive train 1—which were described with reference to the points in time T2, T3 and T4—exist with corresponding changes in the graphs of the operating state parameters according to FIG. 2.

An adaptation of the transmission capability of the multi-disk clutch 14 by setting the actuating pressure accordingly is always carried out with great spontaneity when a changed operating situation is detected. In practical application, the actuating pressure is changed in a working cycle of the control device that follows the working cycle during which the change was detected.

Reference Characters 1 drive train
2 drive motor
3 main gearbox
4 vehicle rear axle
5 vehicle front axle
6A, 6B drive wheel
7A, 7B drive wheel
8 longitudinal transfer case
9 multi-disk clutch
10A, 10B output shaft
11A, 11B output shaft
12 front differential
13 rear differential
14 multi-disk clutch
15A, 15B vehicle longitudinal shaft
16 hydraulic control device
17 electronic transmission control
M_IGS actual overall locking torque
M_LK transmission capability of the multi-disk clutch
M_SGS target overall locking torque
M_SS mechanical self-locking torque

The invention claimed is:

1. A method of operating a transmission device (8, 13) comprising at least one input shaft (15B) and at least two output shafts (10A, 10B), wherein torque present on the input shaft (15B) is distributed with a variable degree of distribution between the two output shafts (10A, 10B), and the degree of torque distribution of at least one shift element (9, 14) is changed according to an operating state depending on a transmission capability (M_LK) of at least one shift element (9, 14), the method comprising the steps of:
   determining, by a transmission control device, a mechanical self-locking torque (M_SS) of the transmission device (8, 13) when a request to set a predefined degree of torque distribution is received, the mechanical self-locking torque (M_SS) of the transmission device influences the degree of torque distribution between the two output shafts (10A, 10B) and is dependent upon the torque present at the input shaft (15B) of the transmission device;
   determining, by the transmission control device, a difference between the mechanical self-locking torque (M_SS) and a target overall locking torque (M_SGS) of the transmission device (8, 13), the target overall locking torque (M_SGS) of the transmission device is equivalent to the required degree of torque distribution between the two output shafts; and
   setting, by the transmission control device, the transmission capability (M_LK) of the at least one shift element (9, 14) as a function of the difference between the mechanical self-locking torque (M_SS) and the target overall locking torque (M_SGS).

2. The method according to claim 1, further comprising the step of setting the transmission capability (M_LK) of the shift element (9, 14) to at least approximately zero when the target overall locking torque (M_SGS) of the transmission device (8, 13) is less than or equal to the mechanical self-locking torque (M_SS) of the transmission device (8, 13).

3. The method according to claim 1, further comprising the step of varying, by the transmission control device, the mechanical self-locking torque (M_SS) of the transmission device (8, 13) depending on the transmission capability (M_LK) of the shift element (9, 14) that was determined; and
   adjusting, by the transmission control device, the transmission capability (M_LK) of the shift element depending on the mechanical self-locking torque (M_SS) which was corrected in respect to transmission capability.

4. The method according to claim 1, further comprising the step of determining the mechanical self-locking torque (M_SS) of the transmission device depending on a characteristic map.

5. The method according to claim 4, further comprising the step of determining the mechanical self-locking torque (M_SS) of the transmission device using the characteristic map taking into account the torque present at the input shaft and at least one of:
   a speed differential of the two output shafts (10A, 10B), a sign of the speed differential of the two output shafts (10A, 10B), an operating temperature of the transmission device (8, 13), a running performance of the transmission device (8, 13) as determined by an odometer, and an actuating pressure of the at least one shift element (9, 14).

6. The method according to claim 1, further comprising the step of setting the transmission capability (M_LK) of the shift element (9, 14) depending on the operating state via an actuating pressure that can be applied to the shift element (9, 14), and using a hydraulically actuatable, frictionally engaged shift element as least one shift element (9, 14).

7. The method according to claim 6, further comprising the step of using a multi-disk clutch as the hydraulically actuatable, frictionally engaged shift element.

8. The method according to claim 1, further comprising the step of determining the mechanical self-locking torque (M_SS) of the transmission device (8, 13) at every operating point.

9. The method according to claim 1, further comprising the step of distributing the torque present at the input shaft with a variable degree of distribution between two axle shafts of a drivable vehicle axle, and the transmission device (13) being a differential comprising a differential lock formed by the at least one shift element (14).

10. The method according to claim 1, further comprising the step of distributing the torque present at the input shaft with a variable degree of distribution between at least two vehicle longitudinal shafts (15A, 15B), and the transmission device (8) is a longitudinal transfer case.

* * * * *